United States Patent [19]

Morini

[11] Patent Number: 4,861,007
[45] Date of Patent: Aug. 29, 1989

[54] ELEMENT FOR SUPPORTING SUSPENSION-SPRINGS

[75] Inventor: Emilio Morini, Milan, Italy

[73] Assignee: Pirelli Sistemi Antivibranti S.p.A., Milan, Italy

[21] Appl. No.: 176,296

[22] Filed: Mar. 31, 1988

[30] Foreign Application Priority Data

Mar. 31, 1987 [IT] Italy ............................ 19906 A/87

[51] Int. Cl.[4] .......................... F16F 1/36; B16F 5/02
[52] U.S. Cl. ................................ 267/153; 267/140.3; 267/140.5; 267/141.1; 267/151; 267/294
[58] Field of Search ............... 267/140.1, 136, 140.3, 267/140.5, 141, 141.1, 141.2, 153, 137, 141.3, 293, 292, 294, 257, 258, 163, 201, 35, 281, 280, 140, 151, 152; 248/557, 562, 636; 296/35.3, 35.1

[56] References Cited

U.S. PATENT DOCUMENTS 4,562,775  1/1986  Jackson et al. .................. 105/186

FOREIGN PATENT DOCUMENTS 923850    1/1955  Fed. Rep. of Germany .
1264876   3/1968  Fed. Rep. of Germany ...... 267/152
1605056   4/1971  Fed. Rep. of Germany .
2747290   4/1979  Fed. Rep. of Germany ...... 267/151
8535955   4/1986  Fed. Rep. of Germany .
0898053   4/1945  France ............................ 267/140.3
957723    3/1959  France .
0030371   3/1979  Japan .............................. 267/141.1
0373926   1/1964  Switzerland .................... 267/151
2114706   8/1983  United Kingdom ............. 267/294

Primary Examiner—Andres Kashnikow
Assistant Examiner—Mark T. Le
Attorney, Agent, or Firm—Oblon, Spivak, McClelland, Maier & Neustadt

[57] ABSTRACT

An element for supporting the suspension-springs of railway wagons including a bottom plate, an intermediate plate and a parallel adjacent supporting plate provided with the interposition of first and second elastic rings which are connected to the plates at their respective contacting surfaces. The second elastic ring has a greater rigidity compared to that of the first elastic ring. The greater rigidity is obtained by forming the second ring to have a lesser height (L") than that (L') of the first ring, or by use of an elastomeric material that is more rigid than the material which is used for forming the first ring.

11 Claims, 1 Drawing Sheet

ELEMENT FOR SUPPORTING SUSPENSION-SPRINGS

BACKGROUND OF THE INVENTION

1. Field of the Invention:

The present invention relates to an element for supporting suspension-springs such as those of railway wagons and the like.

More particularly, the supporting element is of the type having a bottom plate for the connecting of the supporting element to a railway wagon, a supporting plate extending parallel to the bottom plate, a positioning collar perpendicularly extending from the supporting plate on the opposite side of the bottom plate, an intermediate plate interposed in parallel between the bottom plate and the supporting plate, a first ring of elastomeric material coaxially disposed with respect to the positioning collar and interposed between the bottom and the intermediate and a second ring of elastomeric material coaxially disposed with respect to the positioning collar and interposed between the intermediate plate and the supporting plate, to which it is connected by the contacting surfaces.

2. Background of the Related Art

As known, railway wagons are essentially composed of two or more wheel assemblies above which a box structure is disposed in which passengers or goods to be transported are housed.

Generally, the box is to be elastically suspended with respect to the wheel assemblies, known as trucks, through interposition between the box and the trucks of a plurality of vertically disposed metallic, helicoidal springs.

These springs are subjected to deformations in an anomalous way during the execution of curves by the wagon, particularly when they are disposed on lateral sides of the wagon. In fact, during this time the trucks each rotate about a vertical axis with respect to the box and the box inclines laterally with respect to the trucks due to centrifugal force. The springs are therefore obliged to follow the relative movements between the corresponding trucks and the box while bending along their longitudinal axis.

To confine the anomalous deformations to which the springs are subjected, it is known that each of them is engaged with the truck and with th box by interposition of suitable supporting elements which are elastically deformable.

A first type of known supporting element comprises, essentially, a bottom plate which is connected to the truck or to the wagon box, a supporting plate, parallel to the bottom plate, on which acts one end of the spring and a rubber elastic ring interposed between the bottom plate and the supporting plate and which is rigidly connected to the same by a rubber-metal union.

From the supporting plate extends, from a central position and towards the direction opposite to the bottom plate, a positioning collar intended to be inserted at the end of the spring in order to inhibit shifting of the latter with respect to the supporting plate.

During the execution of curves by the wagon, the rubber ring is elastically deformed both due to tangential forces and to the couples transmitted by the spring to the supporting element; thus the spring tends to deform in the above specified manner.

The rubber ring's deformations corresponding to the supporting elements respectively associated with the opposed ends of each spring make the supporting plate of the same elements tend, within certain limits, to be oriented so as to reciprocally align the axes of the relevant positioning tangs. In this way the anomalous deformations of the spring are considerably reduced.

In spite of the above, the supporting elements of this type present a satisfactory behavior only when they are associated with springs positioned near the longitudinal axis of the wagon, and therefore subjected to deformations which are relatively confined during the execution of the curves. Conversely, these supporting elements have been found not to be able to sufficiently reduce the anomalous deformations of the springs when they are positioned near the extreme lateral sides of the wagon.

In order to remedy these limitations, supporting elements have been made, conceptually similar to those of the type previously described, but provided with two elastic rings having the same dimensions and rigidity, axially separated by an intermediate plate extending parallel to the above mentioned plates in a median position between the same. The elastic rings are interposed one between the bottom and the intermediate plate and the other between the intermediate and the supporting plate, and are rigidly connected to the same by a rubber-metal union.

The presence of two elastic rings instead of one confers on these supporting elements a greater functionality in comparison with those of the type previously described. Nevertheless, the supporting elements provided with two elastic rings are not capable of sufficiently reducing the anomalous deformations of the springs.

This is due to the fact that the design constraints of the suspensions of which the springs in question are part do not permit one to make the elastic rings with a material having a smaller rigidity than that of predetermined values. At such values, in fact, the deformations of the rings, due to compression and shear stress, would negatively affect the whole behavior of the suspension.

SUMMARY OF THE INVENTION

The object of the present invention is to resolve the above mentioned drawback, realizing a supporting element that, in spite of presenting a sufficiently high rigidity both for compression and for shearing, is capable of satisfactorily reducing the anomalous deformations of the springs when the same springs are positioned at the extreme sides of the railway wagon.

This purpose and others, which will be still better understood from the following detailed descriptions, are achieved by an element for supporting the suspension-springs of railway wagons and the like in which the second ring of elastomeric material has a smaller height than that of the first ring of elastomeric material. According to another embodiment of the invention, the same purposes are achieved by a supporting element of the above mentioned type in which the second ring is made with material more rigid than that constituting the first one.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
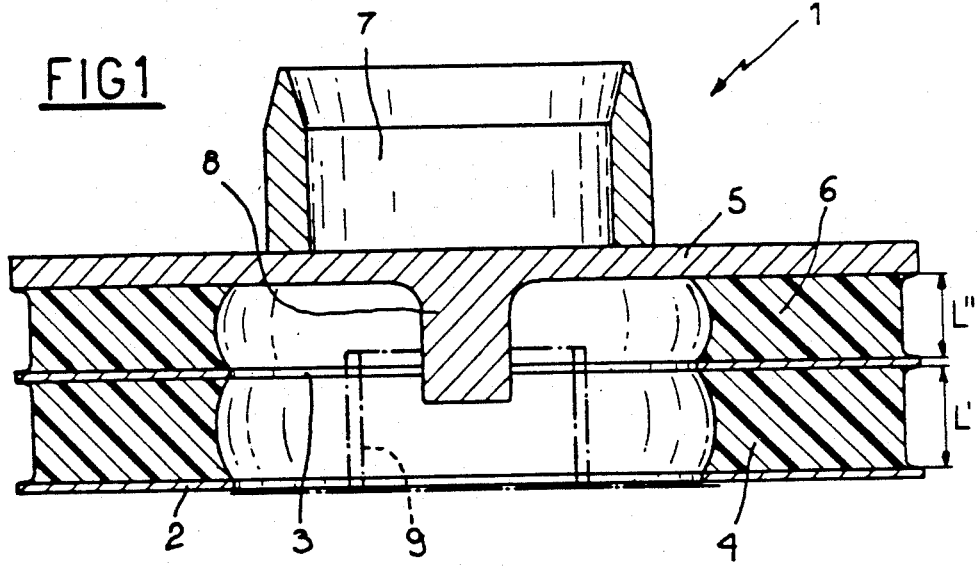
FIG. 1 is a diametric section of a supporting element according to an embodiment of the invention.

With reference to FIG. 1, an element 1 for supporting the suspension-springs of railway wagons and the like comprises an annular bottom plate 2, as well as an intermediate plate 3 extending parallel to the bottom plate 2 at a predetermined distance from the same. The intermediate plate 3 has an annular shape and is coaxially disposed with respect to the bottom plate 2.

Between the bottom plate 2 and the intermediate plate 3 is coaxially interposed a first ring 4 of elastomeric material, connected to the plates 2 and 3 by a rubber-metal union.

A flat, circular shape supporting plate 5 is coaxially and parallelly disposed with respect to the intermediate plate 3 on the opposite side thereof with respect to the bottom plate 2.

Between the supporting plate 5 and the intermediate plate 3 is coaxially disposed a second ring 6 of elastomeric material, which is rigidly connected to the plates 3 and 5 by the rubber-metal union.

According to the invention, the height $L''$ of the second ring 6 is smaller than the height $L'$ of the first ring 4. More particularly, the maximum values of the ratio between the height $L''$ of the second ring 6 and the height $L'$ of the first ring 4 are:

$$0.7 \leq L''/L' < 1.0.$$

The values of the ratio between the height of each ring 4, 6 and the difference between the outer and inner diameters of the same rings are between 0.1 and 0.25.

On the supporting plate 5 is also coaxially fixed, at the side opposite the bottom plate 2, a conventional positioning collar 7.

In a novel way, there is also extending from the center of the supporting plate 5 in the opposite direction from the positioning collar 7, a stopping tang 8 intended to fit in a gap in a stopping collar 9, indicated by a chain line, rigidly fixed to a side of a railway wagon to which the supporting element 1 is mounted.

After describing the above in a structural way, the functioning of the supporting element according to the invention is the following:

The supporting element 1 is to be fixed, at its bottom plate 2, to a truck or to the box of a railway wagon (not illustrated) The positioning collar 7 fits in or around the end of helicoidal spring extending between the other of the above-mentioned box and truck.

When the railway wagon is running on a rectilinear path, the supporting element 1 must support only compression stresses which are transmitted by the above mentioned spring due to the axial loads acting on the same.

These stresses are accompanied by an elastic deformation of rings 4 and 6 in an axial direction. Under such circumstances, the supporting element has exactly the same behavior as a supporting element of conventional type with the same outer dimensions and materials employed.

When the railway wagon is running on a curvilinear route, the supporting element 1 is also subjected to forces tangentially acting in on the supporting plate 5, as well as to bending couples due to the non-alignment of the box with respect to the truck.

The above combination of forces and couples then applied on the supporting plate 5 produces a couple that tends to rotate the supporting plate 5 about a horizontal axis, together with elastic deformations transmitted to the rings 4 and 6.

The smaller height of the second ring 6 in respect to that of the first one 4 causes the second ring in this condition to have, in relation to the tangential stresses and to the applied couples, a greater rigidity than that presented by first ring 4, optimizing the ratio between the transverse flexibility and the flexional flexibility of the element 1.

This fact produces, in comparison with the supporting element of the known type wherein the rings have equal heights, a shifting of the rotation axis of the supporting plate 5 away from the positioning collar 7, and towards the truck or the box to which the supporting element is fastened.

The shifting of the rotation axis of the supporting plate 5 makes it and the end of the spring linked to it rotate by greater arcs in comparison with the known supporting elements, in response to given tangential forces and applied couples.

In this way the anomalous deformations transmitted to the spring are reduced by a degree greater than was possible by supporting elements of the known type.

As a matter of fact, the supporting element associated with the respective opposed ends of the spring provide, in comparison with the prior art, a greater tendency to orient the axes of the respective positioning collars 7 in alignment, reducing the width of the sinusoidal spring deformation.

Advantageously, the presence of tang 8 engaged in the stopping collar 9 limits the supporting plate 5 from being transferred and/or rotated in respect to the bottom plate 2 beyond a predetermined value where the stresses given to rings 4 and 6 could be excessive. The invention thus achieves all its objectives.

In fact the supporting element in reference, in spite of having the same behavior as that of the known supporting element in relation to the compression stresses, provides better behavior in connection with tangential stresses and the applied couples, being capable of satisfactorily limiting the anomalous deformations of the springs associated with it, and also when this spring works under particularly heavy conditions.

Figure 2:
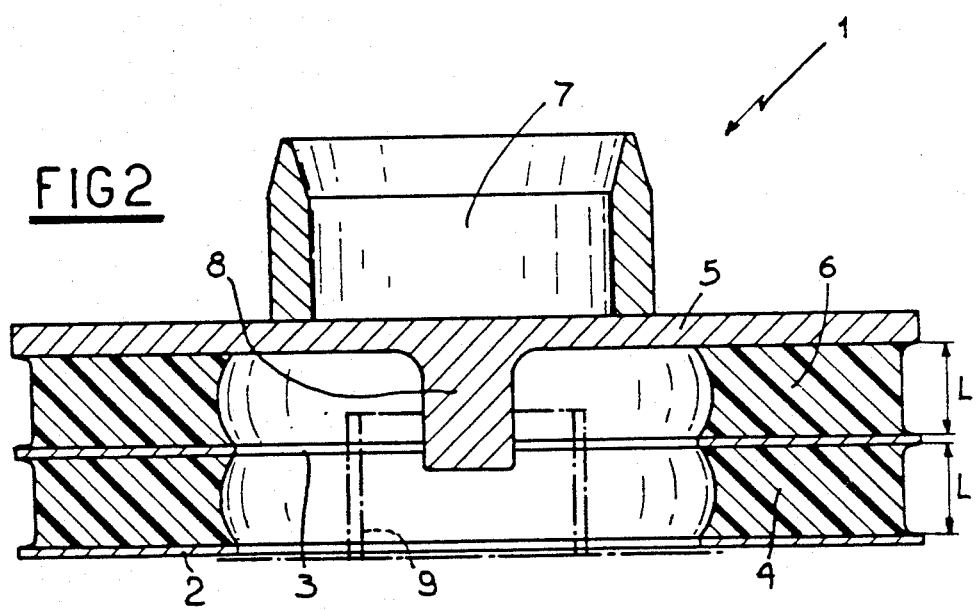
FIG. 2 is a diametric section of a supporting element according to another embodiment of the invention.

In FIG. 2 is shown another embodiment of the invention that resolves the problems of the known technique and that is based on the idea of moving the rotation center of the supporting plate 5 way from the positioning collar 7 and the associated spring. For this purpose, this embodiment provides that the second ring 6 is composed of a material having a greater rigidity than that of the material constituting the first ring 4. In this way a greater rigidity of the second ring 6 is achieved, although the height of the latter is equal to that of the first ring 4, as shown in FIG. 2 in which said heights are indicated as L.

Obviously, the present invention is subjected to further modifications and variations, without departing from the inventive idea that characterizes the same. Particularly, the differentiated rigidity of the rings 4 and 6 can instead be obtained by varying the diametric dimensions of the same rings, as well as by suitably combining the different proposed solutions and/or other solutions which are technically equivalent.

What is claimed as new and desired to be secured by Letters Patent of the United States is:

1. Element for supporting suspension-springs comprising:
   a bottom plate;
   a supporting plate positioned above and parallel to the bottom plate;
   a positioning collar extending from a surface of said supporting plate in a direction perpendicular to the supporting plate and towards the opposite direction of the bottom plate;
   an intermediate plate parallely interposed between said bottom plate and said supporting plate;
   a first ring of elastomeric material coaxially disposed with respect to the positioning collar and interposed between said bottom plate and said intermediate plate, said first ring being united with said bottom plate and said intermediate plate;
   a second ring of elastomeric material coaxially disposed with respect to the positioning collar and interposed between said intermediate plate and said supporting plate, to which said second ring is united, wherein said second ring has a height (L') in a direction perpendicular to said surface smaller than a height (L') of the first ring, wherein a ratio between the height of each said first and second ring and the difference between the respective outer and inner diameter thereof is between 0.1 and 0.25.

2. Supporting element according to claim 1, wherein: $0.7 \leq L''/L' < 1.0$.

3. Supporting element according to claim 1 including a tang extending from the supporting plate towards the bottom plate and into a stopping collar fixed relative to said bottom plate.

4. Element for supporting suspension-springs comprising:
   a bottom plate;
   a supporting plate positioned above and parallel to the bottom plate;
   a positioning collar extending from a surface of said supporting plate in a direction perpendicular to the supporting plate and towards the opposite direction of the bottom plate;
   an intermediate plate parallely interposed between said bottom plate and said supporting plate;
   a first ring of elastomeric material coaxially disposed with respect to the positioning collar and interposed between said bottom plate and said intermediate plate, said first ring being united with said bottom plate and said intermediate plate;
   a second ring of elastomeric material coaxially disposed with respect to the positioning collar and interposed between said intermediate plate and said supporting plate, to which said second ring is united;
   wherein a material constituting said second ring has a greater hardness than a material constituting said first ring, and wherein a ratio between the height of each said first and second ring and the difference between the respective outer and inner diameter thereof is between 0.1 and 0.25.

5. Supporting element according to claim 4 including a tang extending from the supporting plate towards the bottom plate and into a stopping collar fixed relative to said bottom plate.

6. Element for supporting suspension-springs comprising:
   a rigid bottom plate fixed to an element;
   a supporting plate positioned above and parallel to the bottom plate and to which a spring is attached;
   a positioning collar extending from a surface of said supporting plate in a direction perpendicular to the supporting plate and towards the opposite direction of the bottom plate;
   an intermediate plate parallely interposed between said bottom plate and said supporting plate;
   a first ring of elastomeric material coaxially disposed with respect to the positioning collar and interposed between said bottom plate and said intermediate plate, said first ring being united with said bottom plate and said intermediate plate;
   a second ring of elastomeric material coaxially disposed with respect to the positioning collar and interposed between said intermediate plate and said supporting plate, to which said second ring is united;
   wherein a material constituting said second ring has a greater hardness than a material constituting said first ring.

7. Supporting element according to claim 6 wherein a horizontal axis of rotation of said supporting plate in response to bending couples applied thereto is shifted towards said bottom plate.

8. Supporting element according to claim 6 including a tang extending from the supporting plate towards the bottom plate and into a stopping collar fixed relative to said bottom plate.

9. Element for supporting suspension-springs comprising:
   a rigid bottom plate fixed to an element;
   a supporting plate positioned above and parallel to the bottom plate and to which a spring is attached;
   a positioning collar extending from a surface of said supporting plate in a direction perpendicular to the supporting plate and towards the opposite direction of the bottom plate;
   an intermediate plate parallely interposed between said bottom plate and said supporting plate;
   a first ring of elastomeric material coaxially disposed with respect to the positioning collar and interposed between said bottom plate and said intermediate plate, said first ring being united with said bottom plate and said intermediate plate;
   a second ring of elastomeric material coaxially disposed with respect to the positioning collar and interposed between said intermediate plate and said supporting plate, to which said ring is united;
   wherein said second ring has a height in a direction perpendicular to said surface smaller than a height of the first ring.

10. Supporting element according to claim 9 wherein a horizontal axis of rotation of said supporting plate in response to bending couples applied thereto is shifted towards said bottom plate.

11. Supporting element according to claim 9 including a tang extending from the supporting plate towards the bottom plate and into a stopping collar fixed relative said bottom plate.

* * * * *